(12) United States Patent
Baba

(10) Patent No.: US 10,591,704 B2
(45) Date of Patent: Mar. 17, 2020

(54) IMAGING DEVICE AND ELECTRONIC DEVICE

(71) Applicant: SONY SEMICONDUCTOR SOLUTIONS CORPORATION, Kanagawa (JP)

(72) Inventor: Tomohiko Baba, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 3 days.

(21) Appl. No.: 15/776,286

(22) PCT Filed: Nov. 16, 2016

(86) PCT No.: PCT/JP2016/083903
§ 371 (c)(1),
(2) Date: May 15, 2018

(87) PCT Pub. No.: WO2017/094503
PCT Pub. Date: Jun. 8, 2017

(65) Prior Publication Data
US 2018/0329178 A1  Nov. 15, 2018

(30) Foreign Application Priority Data
Nov. 30, 2015 (JP) .................. 2015-233452

(51) Int. Cl.
*G02B 13/00* (2006.01)
*G02B 13/02* (2006.01)
*G02B 9/08* (2006.01)

(52) U.S. Cl.
CPC .............. *G02B 13/005* (2013.01); *G02B 9/08* (2013.01); *G02B 13/0045* (2013.01); *G02B 13/02* (2013.01)

(58) Field of Classification Search
CPC .......... G02B 3/00; G02B 6/32; G02B 13/005; G02B 21/02; G02B 7/027; G02B 21/33;
(Continued)

(56) References Cited

U.S. PATENT DOCUMENTS 4,545,652 A  10/1985 Hoogland
4,575,195 A  3/1986 Hoogland
(Continued)

FOREIGN PATENT DOCUMENTS

CN  103364930 A  10/2013
DE  3220350 A1  2/1983
(Continued)

OTHER PUBLICATIONS

International Search Report and Written Opinion of PCT Application No. PCT/JP2016/083903, dated Feb. 7, 2017, 13 pages of ISRWO.

*Primary Examiner* — William R Alexander
*Assistant Examiner* — Sharrief I Broome
(74) *Attorney, Agent, or Firm* — Chip Law Group

(57) ABSTRACT

The present disclosure relates to an imaging device and an electronic device capable of proposing an imaging device provided with an imaging element having the largest class size for consumer use and a unifocal lens optically brighter and having a simpler lens configuration. An imaging device according to a first aspect of the present disclosure is provided with a unifocal lens including a first lens group having positive power, an aperture stop, and a second lens group having positive power in this order from an object
(Continued)

side, and an imaging element curved with a concave surface facing the object side, the imaging element generating an image signal in accordance with incident light collected by the unifocal lens. The present disclosure is applicable to optical devices for astronomical observation applications, for example.

6 Claims, 15 Drawing Sheets

(58) Field of Classification Search
CPC ........ G02B 3/02; G02B 6/4206; G02B 13/06; G02B 3/0056; G02B 6/4204; G02B 13/0055; G02B 13/24; G02B 15/177; G02B 21/0072; G02B 9/06; G02B 19/0028; G02B 19/0071; G02B 1/041; G02B 23/2492; G11B 7/1374; G11B 2007/13727; G11B 7/1387; G11B 7/1353; G11B 7/13922; G11B 7/1398; G11B 11/10532; G11B 11/10536; G11B 11/10543; G11B 11/10554; G11B 11/1058; G11B 7/08564; G11B 7/121; G11B 7/122; G11B 7/123; G11B 7/1372; G11B 7/1378; G11B 7/139; G11B 7/1392; G11B 7/22
See application file for complete search history.

(56) References Cited

U.S. PATENT DOCUMENTS

| | | | | |
|---|---|---|---|---|
| 5,555,131 | A * | 9/1996 | Horton | G02B 1/02 |
| | | | | 359/661 |
| 9,398,202 | B2 * | 7/2016 | Ishihara | G02B 6/06 |
| 2013/0258490 | A1 * | 10/2013 | Ishihara | G02B 13/18 |
| | | | | 359/648 |
| 2014/0015997 | A1 * | 1/2014 | Baba | G02B 13/003 |
| | | | | 348/222.1 |
| 2015/0309285 | A1 | 10/2015 | Ishihara | |
| 2015/0370037 | A1 * | 12/2015 | Ishihara | G02B 9/60 |
| | | | | 348/294 |

FOREIGN PATENT DOCUMENTS

| | | | |
|---|---|---|---|
| JP | 57-207215 | A | 12/1982 |
| JP | 06-292207 | A | 10/1994 |
| JP | 07-104181 | A | 4/1995 |
| JP | 11-252431 | A | 9/1999 |
| JP | 11-264931 | A | 9/1999 |
| JP | 2012-237966 | A | 12/2012 |
| JP | 2013-210543 | A | 10/2013 |
| JP | 2013-210549 | A | 10/2013 |
| JP | 2016-170444 | A | 9/2016 |
| WO | 2012/147841 | A1 | 11/2012 |
| WO | 2012/173026 | A1 | 12/2012 |

* cited by examiner

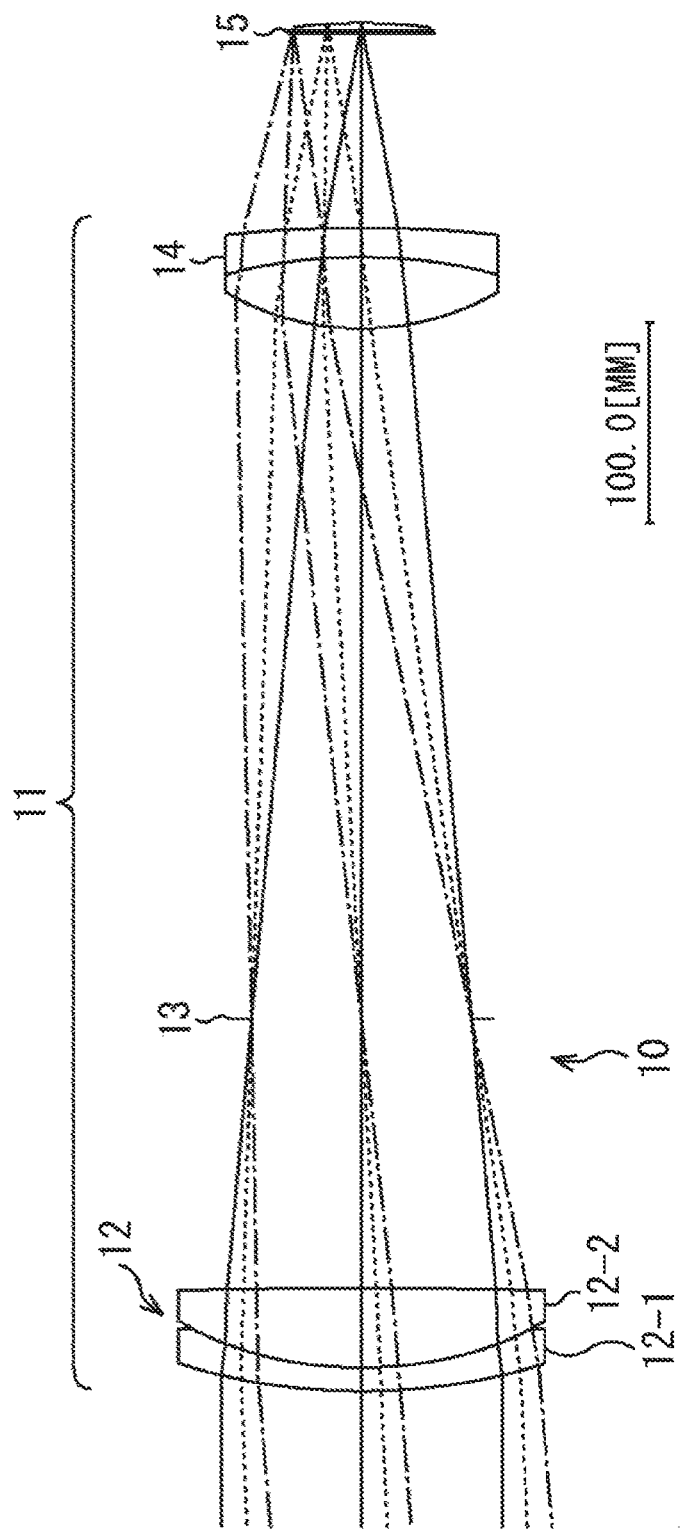

IMAGING DEVICE AND ELECTRONIC DEVICE

CROSS REFERENCE TO RELATED APPLICATIONS

This application is a U.S. National Phase of International Patent Application No. PCT/JP2016/083903 filed on Nov. 16, 2016, which claims priority benefit of Japanese Patent Application No. JP 2015-233452 filed in the Japan Patent Office on Nov. 30, 2015. Each of the above-referenced applications is hereby incorporated herein by reference in its entirety.

TECHNICAL FIELD

The present disclosure relates to an imaging device and an electronic device, and especially relates to an imaging device using a telephoto lens and a curved sensor, and an electronic device.

BACKGROUND ART

In recent years, digital imaging devices using imaging elements such as a CCD and a CMOS remarkably advance, and especially, high resolution, a low cost, and miniaturization are strongly demanded for imaging devices mounted on mobile devices, PCs and the like.

On the other hand, in a high-end imaging device, in order to enhance performance superiority over a decrease in cost, there is a tendency that a size of the imaging element to be mounted is increased.

For example, Patent Document 1 discloses a general configuration in which a conventional large imaging element and a telephoto lens are combined, but a Fno representing brightness of the lens at infinity (the smaller the value, the brighter, and the larger the value, the darker) is about 8, so that the lens is not bright and having poor resolution. In addition, since the telephoto lens has a lens configuration in which four individual lenses are assembled, a mechanism thereof becomes complicated.

Meanwhile, among telephoto lenses compatible with an imaging element having a 645 size having the largest class size in imaging elements for consumer use, the brightest one has a lens configuration of five lens elements in five groups and realizes Fno 3.8 with a focal length of 380 mm (for example, VSD 100F 3.8 of Vixen Co., Ltd.). Hereinafter, this is referred to as a first existing lens.

In addition to the above, there are commercially available lenses compatible with the imaging element of 645 size realizing Fno 4.5 with a focal length of 300 mm with a lens configuration of nine lens elements in six groups as of 2015 (for example, HC 4.5/300 of HASSELBLAD). Hereinafter, this is referred to as a second existing lens.

CITATION LIST

Patent Document

Patent Document 1: Japanese Patent Application Laid-Open No. 11-264931

SUMMARY OF THE INVENTION

Problems to be Solved by the Invention

As described above, there is the telephoto lens compatible with imaging elements of 645 size at present, but the value of Fno is large, that is, this is not optically bright and has a complicated lens configuration.

The present disclosure is achieved in view of such circumstances, and an object thereof is to propose an imaging device provided with an imaging element having the largest class size for consumer use and a unifocal lens optically brighter and having a simpler lens configuration.

Solutions to Problems

An imaging device according to a first aspect of the present disclosure is provided with a unifocal lens including a first lens group having positive power, an aperture stop, and a second lens group having positive power in this order from an object side, and an imaging element curved with a concave surface facing the object side, the imaging element generating an image signal in accordance with incident light collected by the unifocal lens.

Each of the first and second lens groups may be obtained by adhering a plurality of lenses.

Among a plurality of lenses forming the first lens group, the lens the closest to the object may be a negative meniscus lens having a convex shape on the object side.

Among a plurality of lenses forming the second lens group, the lens the closest to the object may have a biconvex shape.

A focal length $fg1$ of the first lens group may satisfy following expression $1 \leq fg1/f \leq 5$, and a focal length $fg2$ of the second lens group may satisfy following expression $0.5 \leq fg2/f \leq 1.1$.

Herein, f represents a focal length of an entire unifocal lens.

The imaging device according to the first aspect of the present disclosure may be further provided with a correcting unit which performs distortion correction processing on the image signal generated by the imaging element.

An electronic device according to a second aspect of the present disclosure is an electronic device including an imaging unit in which the imaging unit is provided with a unifocal lens including a first lens group having positive power, an aperture stop, and a second lens group having positive power in this order from an object side, and an imaging element curved with a concave surface facing the object side, the imaging element generating an image signal in accordance with incident light collected by the unifocal lens.

In the first and second aspects of the present disclosure, incident light collected by the unifocal lens including the first lens group having positive power, the aperture stop, and the second lens group having positive power in this order from the object side is incident on the imaging element curved with the concave surface facing the object side and the image signal is generated.

Effects of the Invention

According to one aspect of the present disclosure, it is possible to propose an imaging device and an electronic device provided with a unifocal lens optically bright and having a simple lens configuration.

BRIEF DESCRIPTION OF DRAWINGS

FIG. 1 is a view illustrating a configuration example of an imaging device 10 being a first embodiment.

MODE FOR CARRYING OUT THE INVENTION

A best mode for carrying out the present disclosure (hereinafter, referred to as an embodiment) is hereinafter described in detail with reference to the drawings.

1. First Embodiment

FIG. 1 illustrates a configuration example of an imaging device 10 being a first embodiment of the present disclosure.

The imaging device 10 applied to a telescope, a digital camera and the like includes a unifocal lens 11 having a lens configuration of four lens elements in two groups and an imaging element 15 arranged on an image forming surface.

Figures 2A, 2B, 2C:
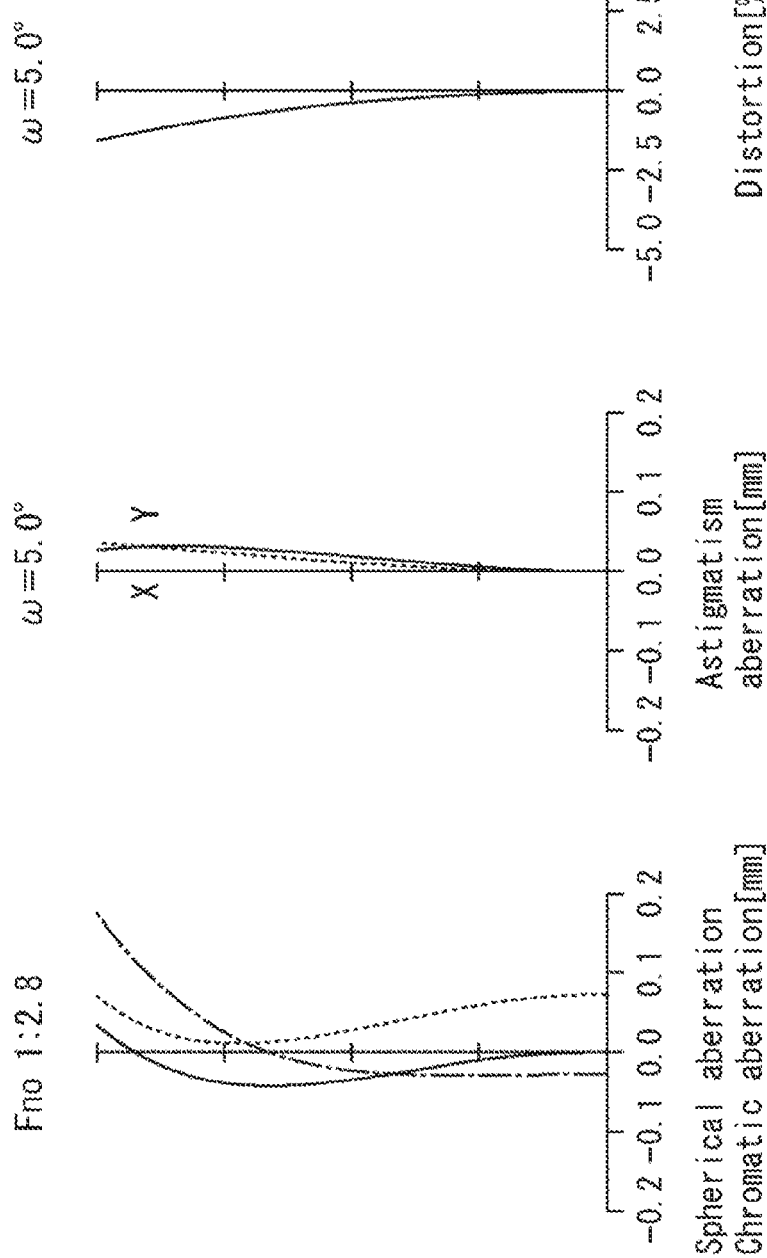
FIGS. 2A, 2B, and 2C are views illustrating various aberrations corresponding to a unifocal lens 11.
Figure 3:
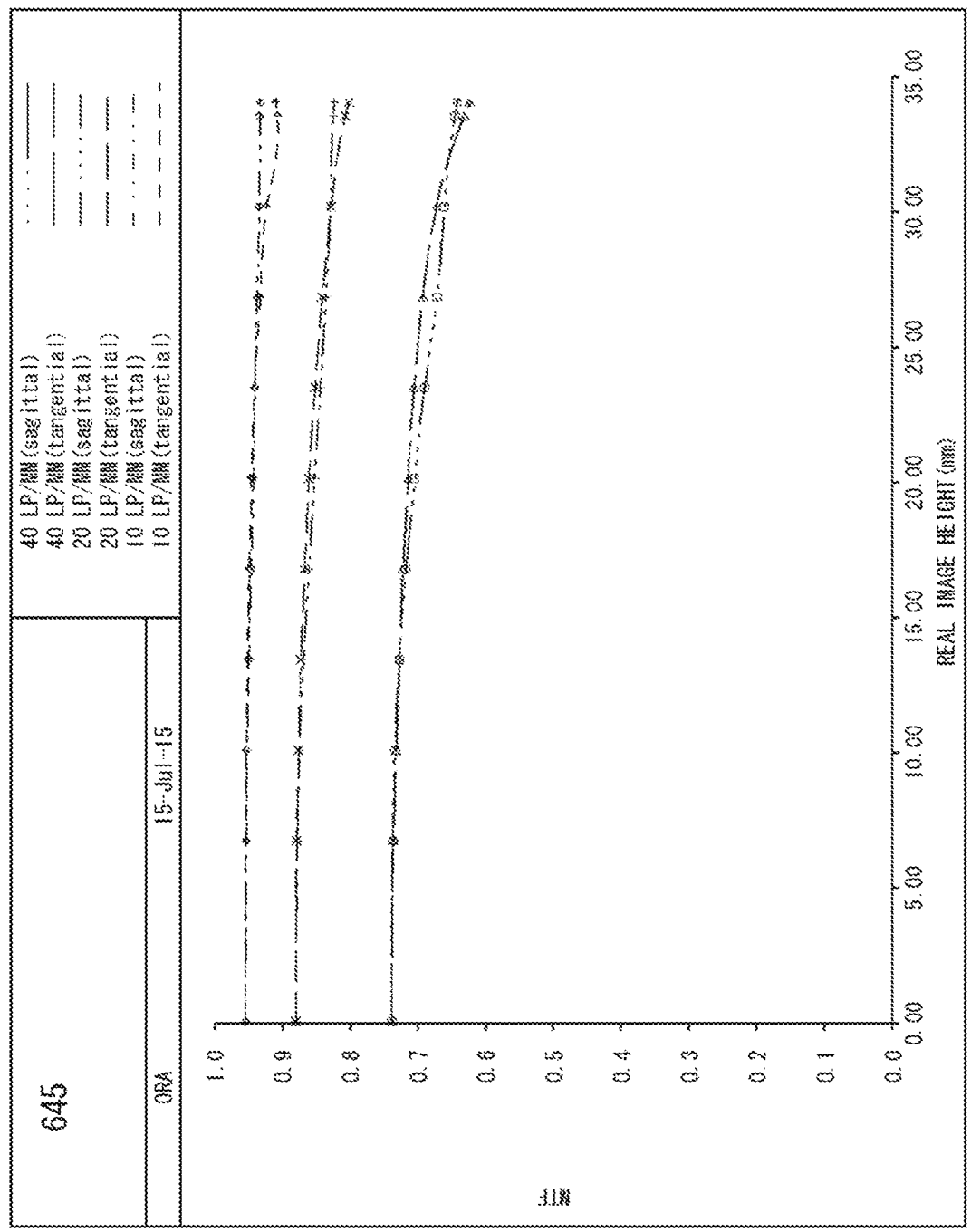
FIG. 3 is a view illustrating a relationship between an image height and an MTF of visual sensitivity corresponding to the unifocal lens 11.

FIGS. 2A, 2B, and 2C illustrate various aberrations corresponding to the unifocal lens 11 of the imaging device 10. FIG. 3 illustrates a relationship between an image height and a modulation transfer function (MTF) of visual sensitivity corresponding to the unifocal lens 11 of the imaging device 10.

The unifocal lens 11 includes a first lens group 12 having positive power, an aperture stop 13, and a second lens group 14 having positive power in this order from an object side.

The first lens group 12 obtained by adhering a negative meniscus first lens 12-1 having a convex shape on the object side to a second lens 12-2 in this order from the object side serves as an achromatic doublet. Between the first lens 12-1 and the second lens 12-2, an optical member may be arranged in addition to a cover glass of resin or glass, an infrared cut filter, a low-pass filter and the like.

A focal length fg1 of the first lens group 12 is designed to satisfy following expression (1).

$$1 \leq fg1/f \leq 5 \quad (1)$$

Herein, f represents a focal length of an entire unifocal lens 11.

The second lens group 14 obtained by adhering a first lens 14-1 having a biconvex shape to a second lens 14-2 in this order from the object side has a shape obtained by inverting the first lens group 12 across the aperture stop 13. The second lens group 14 serves to correct asymmetric aberrations such as off-axis coma and astigmatism by an effect of symmetrical arrangement with the first lens group 12.

A focal length fg2 of the second lens group 14 is designed to satisfy following expression (2).

$$0.5 \leq fg2/f \leq 1.1 \quad (2)$$

Herein, f represents a focal length of an entire unifocal lens 11.

Meanwhile, when fg1/f becomes larger than an upper limit threshold, power becomes large and power of the second lens group 14 becomes smaller from a relationship of entire power distribution and an effect of curvature of the imaging element 15 out of the axis (to be described later) is lost, so that the upper limit threshold (=5) of expression (1) is set to inhibit misalignment of an image surface from a curved shape. When fg1/f becomes smaller than a lower limit threshold, color aberration correction by the first lens group 12 becomes difficult, so that the lower limit threshold (=1) of expression (1) is set to inhibit this.

Also, when fg1/f becomes larger than the upper limit threshold, since the imaging element 15 curves, if the power of the second lens group 14 becomes smaller, the effect of the curvature out of the axis is lost, so that the upper limit threshold (=1.1) of expression (2) is set to inhibit misalignment of the image surface from the curved shape. When fg1/f becomes smaller than the lower limit threshold, the power of the second lens group 14 becomes larger, and even if it is tried to correct the aberration by an action of other optical systems, spherical aberration cannot be fully removed, so that the lower limit threshold (=0.5) of expression (2) is set to inhibit this.

The imaging element 15 including a CMOS and the like has the largest class size for consumer use (for example, 645 size), and is curved with its concave surface facing the object side so as to alleviate a principal ray incident angle. As a result, this serves to correct image surface curvature of the unifocal lens 11 arranged on a preceding stage.

That is, the curved imaging element 15 has a different Petzval sum optimum value as compared with a planar imaging element which is not curved of the same size, and has an optical system different from that in a case where a planar imaging element is applied as the best system. Specifically, the second lens group 14 having the focal length substantially close to the entire focal length corrects the various aberrations on the axis, and the curved imaging element 15 corrects image surface curvature aberration, so that off-axis various aberrations are also substantially inhibited. Then, the remaining various aberrations that cannot be eliminated are corrected by the first lens group 12.

However, it is also possible to perform distortion correction on an output from the imaging element 15.

Specific numerical values in a case where it is designed such that fg1/f=2.00 so as to satisfy expression (1) and fg2/f=0.67 so as to satisfy expression (2) are hereinafter described.

Lens configuration data of the unifocal lens 11 is as follows.

| Surface number | R | d | nd | vd |
|---|---|---|---|---|
| 1: | 309.757 | 11.297 | 1.74 | 44.9 |
| 2: | 192.041 | 40.000 | 1.50 | 81.6 |
| 3: | −3038.637 | 133.327 | | |
| 4(STO): | INFINITY | 343.163 | | |
| 5: | 135.100 | 35.000 | 1.50 | 81.6 |
| 6: | −277.639 | 15.000 | 1.85 | 23.8 |
| 7: | −560.169 | 95.797 | | |
| 8: | INFINITY | 0.700 | 1.52 | 64.1 |
| 9: | INFINITY | 4.000 | | |
| 10(STO): | −250.000 | 0.000 | | |

Configuration data of the unifocal lens 11 is as follows.
f (focal length)=387 mm
F (numerical aperture)=2.8
ω (half field angle)=5.0 deg
H (total lens length)=679 mm The unifocal lens 11 manufactured in accordance with the above-described numerical values may realize a brighter Fno 2.8 with a simpler lens configuration of four lens elements in two groups while ensuring a field angle equivalent to that of a first existing lens. Furthermore, a high MTF may be obtained.

In addition, since the unifocal lens 11 is such that the curved shape of the imaging element 15 has a radius of a spherical surface of 250 mm while satisfying an effective image circle of 645 size, this may be used as an interchangeable lens.

2. Second Embodiment

Figure 4:
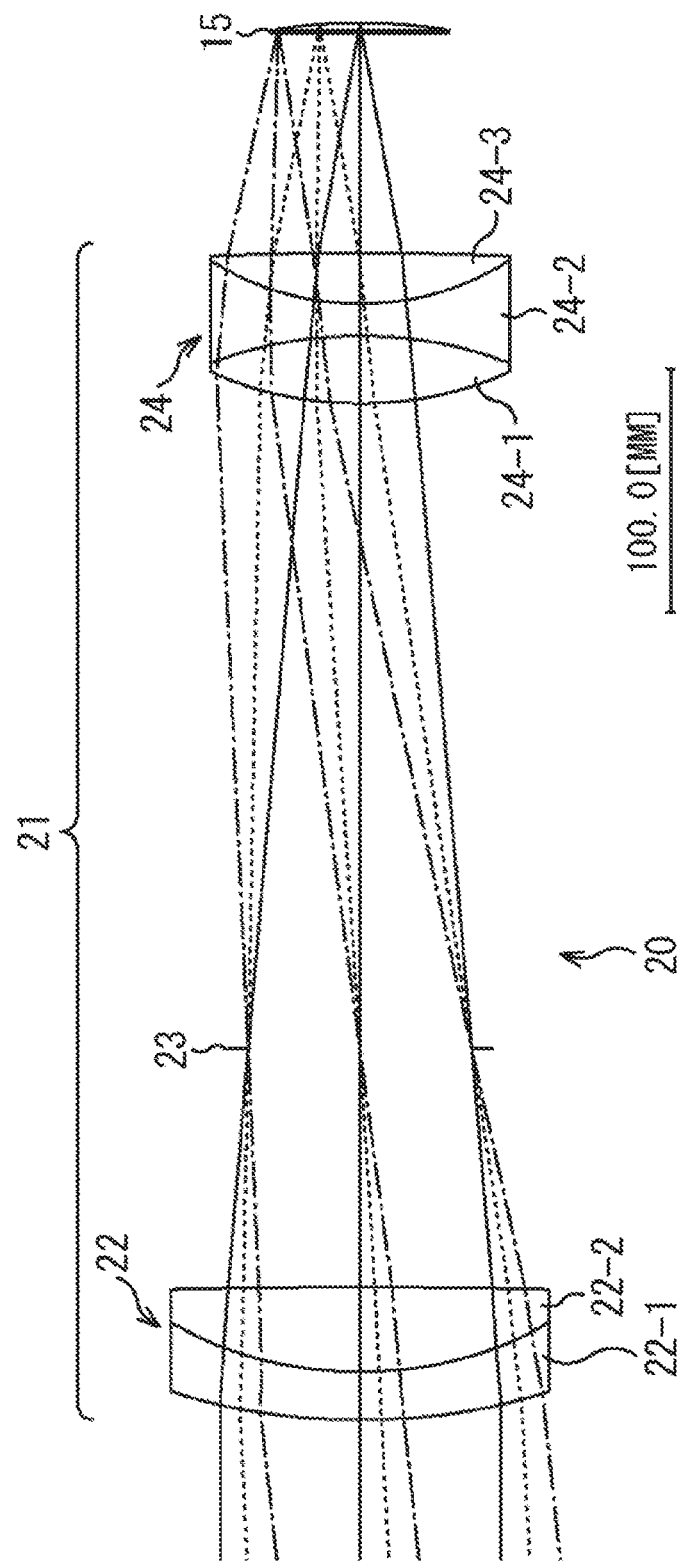
FIG. 4 is a view illustrating a configuration example of an imaging device 20 being a second embodiment.

Next, FIG. 4 illustrates a configuration example of an imaging device 20 being a second embodiment of the present disclosure.

The imaging device 20 applied to a telescope, a digital camera and the like includes a unifocal lens 21 having a lens configuration of five lens elements in two groups and an imaging element 15 the same as that of the above-described imaging device 10.

Figures 5A, 5B, 5C:
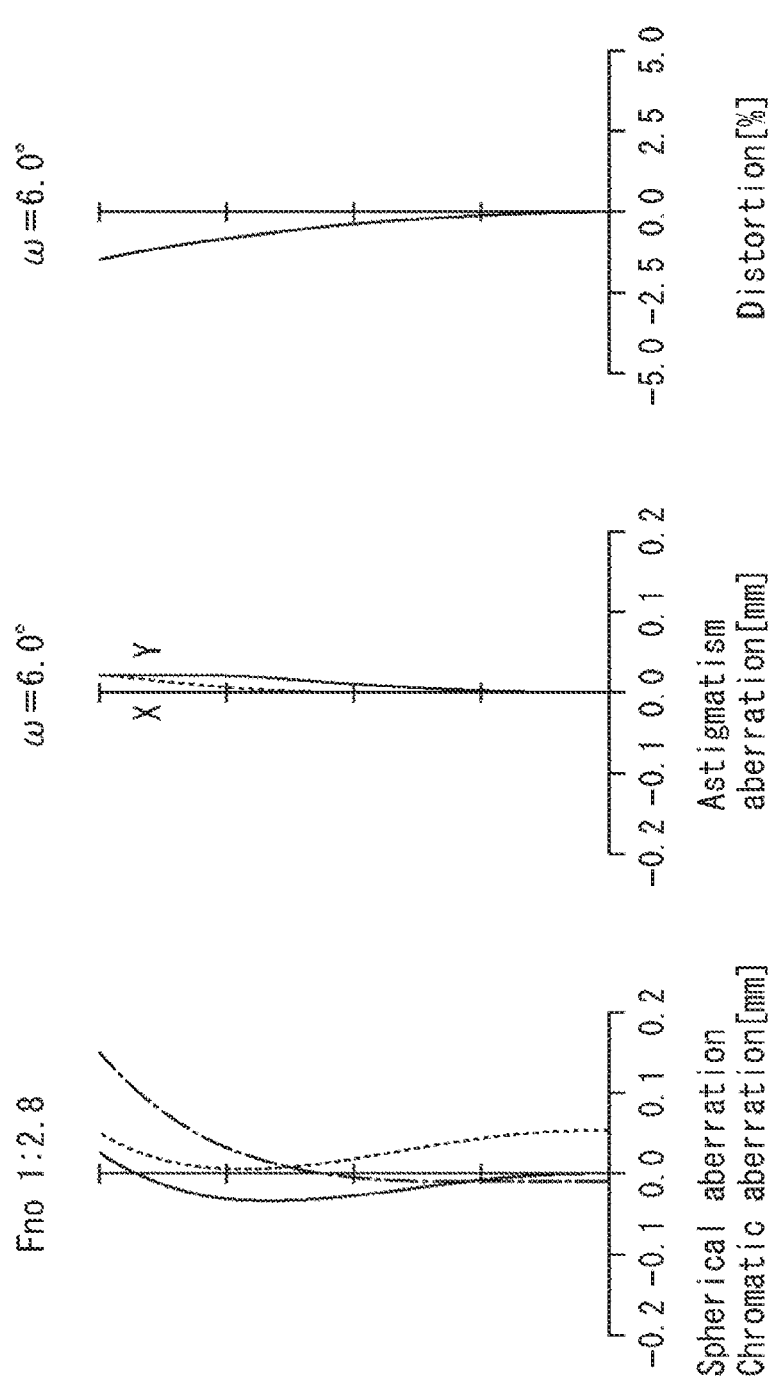
FIGS. 5A, 5B, and 5C are views illustrating various aberrations corresponding to a unifocal lens 21.
Figure 6:
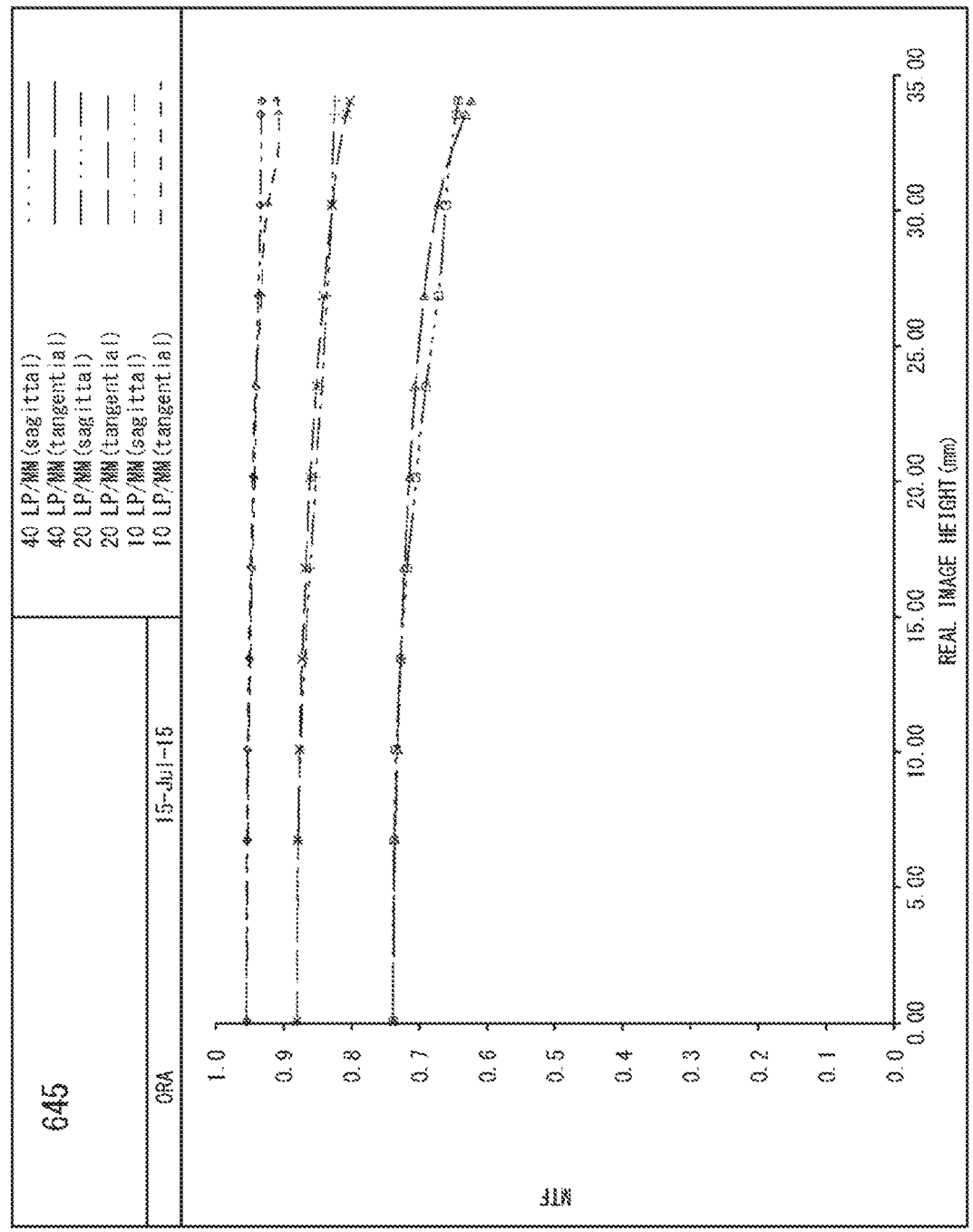
FIG. 6 is a view illustrating a relationship between an image height and an MTF of visual sensitivity corresponding to the unifocal lens 21.

FIGS. 5A, 5B, and 5C illustrate various aberrations corresponding to the unifocal lens 21 of the imaging device 20. FIG. 6 illustrates a relationship between an image height and an MTF of visual sensitivity corresponding to the unifocal lens 21 of the imaging device 20.

The unifocal lens 21 includes a first lens group 22 having positive power, an aperture stop 23, and a second lens group 24 having positive power in this order from an object side.

The first lens group 22 obtained by adhering a negative meniscus first lens 22-1 having a convex shape on the object side to a second lens 22-2 having a biconvex shape serves as an achromatic doublet. Between the first lens 22-1 and the second lens 22-2, an optical member may be arranged in addition to a cover glass of resin or glass, an infrared cut filter, a low-pass filter and the like.

Meanwhile, a focal length fg1 of the first lens group 22 is also designed to satisfy expression (1) described above.

The second lens group 24 has a triplet configuration obtained by adhering a first lens 24-1, a second lens 24-2, and a third lens 24-3 to one another. When considering the second lens 24-2 and the third lens 24-3 as one block, the second lens group 24 has a shape obtained by inverting the first lens group 22 across the aperture stop 23 and serves to correct asymmetric aberrations such as off-axis coma and astigmatism by an effect of symmetrical arrangement of the first lens group 22 and the second lens group 24. In addition, the second lens 24-2 and the third lens 24-3 considered as one block further correct chromatic aberration and off-axis aberration and may obtain a higher aberration correcting effect than that of the second lens group 14 in FIG. 1.

Meanwhile, a focal length fg2 of the second lens group 24 is also designed to satisfy expression (2) described above.

The imaging element 15 serves to correct image surface curvature of the unifocal lens 21 arranged on a preceding stage. That is, the curved imaging element 15 has a different Petzval sum optimum value as compared with a planar imaging element which is not curved of the same size, and has an optical system different from that in a case where a planar imaging element is applied as the best system. Specifically, the second lens group 24 having the focal length substantially close to the entire focal length corrects the various aberrations on the axis, and the curved imaging element 15 corrects image surface curvature aberration, so that off-axis various aberrations are also substantially inhibited. Then, the remaining various aberrations that cannot be eliminated are corrected by the first lens group 22.

However, it is also possible to perform distortion correction on an output from the imaging element 15.

Specific numerical values in a case where it is designed such that fg1/f=2.13 so as to satisfy expression (1) and fg2/f=0.74 so as to satisfy expression (2) are hereinafter described.

Lens configuration data of the unifocal lens 21 is as follows.

| Surface number | R | d | nd | vd |
|---|---|---|---|---|
| 1: | 259.795 | 20.000 | 1.74 | 44.9 |
| 2: | 157.821 | 35.000 | 1.50 | 81.6 |
| 3: | −4478.662 | 97.804 | | |
| 4(STO): | INFINITY | 265.949 | | |
| 5: | 149.381 | 28.209 | 1.50 | 81.6 |
| 6: | −167.924 | 13.000 | 1.54 | 47.2 |
| 7: | 116.937 | 21.334 | 1.62 | 63.4 |
| 8: | −1110.731 | 90.000 | | |
| 9: | INFINITY | 0.500 | 1.52 | 64.1 |
| 10: | INFINITY | 4.000 | | |
| 11(IMG): | −250.000 | 0.000 | | |

Configuration data of the unifocal lens 21 is as follows.
f (focal length)=323 mm
F (numerical aperture)=2.8
ω (half field angle)=6.0 deg
H (total lens length)=576 mm The unifocal lens 21 manufactured in accordance with the above-described numerical values may realize a brighter Fno 2.8 with a simpler lens configuration of five lens elements in two groups while ensuring a field angle equivalent to that of a second existing lens. Furthermore, a high MTF may be obtained.

In addition, since the unifocal lens 21 is such that a curved shape of the imaging element 15 has a radius of a spherical surface of 250 mm while satisfying an effective image circle of 645 size, this may be used as an interchangeable lens.

3. Third Embodiment

Figure 7:
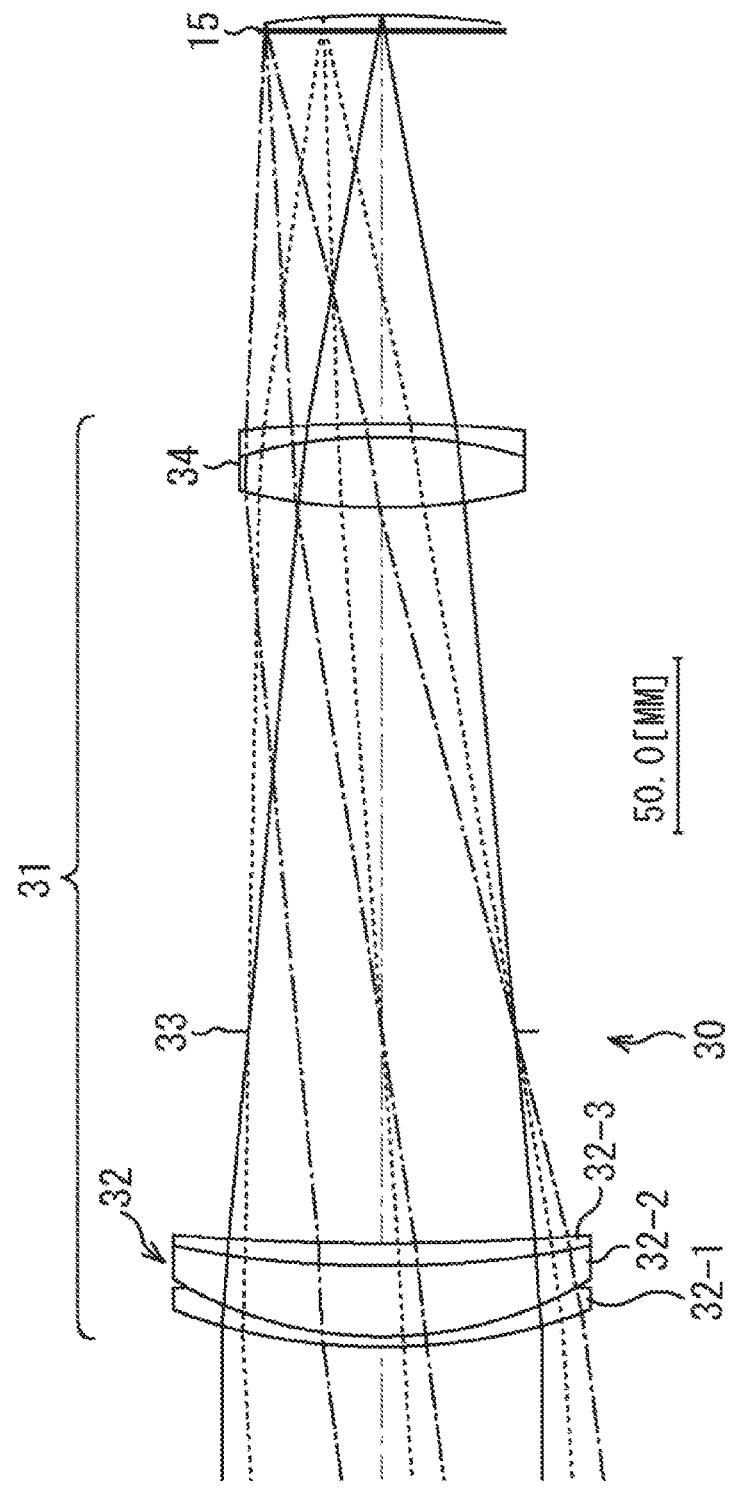
FIG. 7 is a view illustrating a configuration example of an imaging device 30 being a third embodiment.

Next, FIG. 7 illustrates a configuration example of an imaging device 30 being a third embodiment of the present disclosure.

The imaging device 30 applied to a telescope, a digital camera and the like includes a unifocal lens 31 having a lens configuration of five lens elements in two groups and an imaging element 15 the same as that of the above-described imaging device 10.

Figure 8:
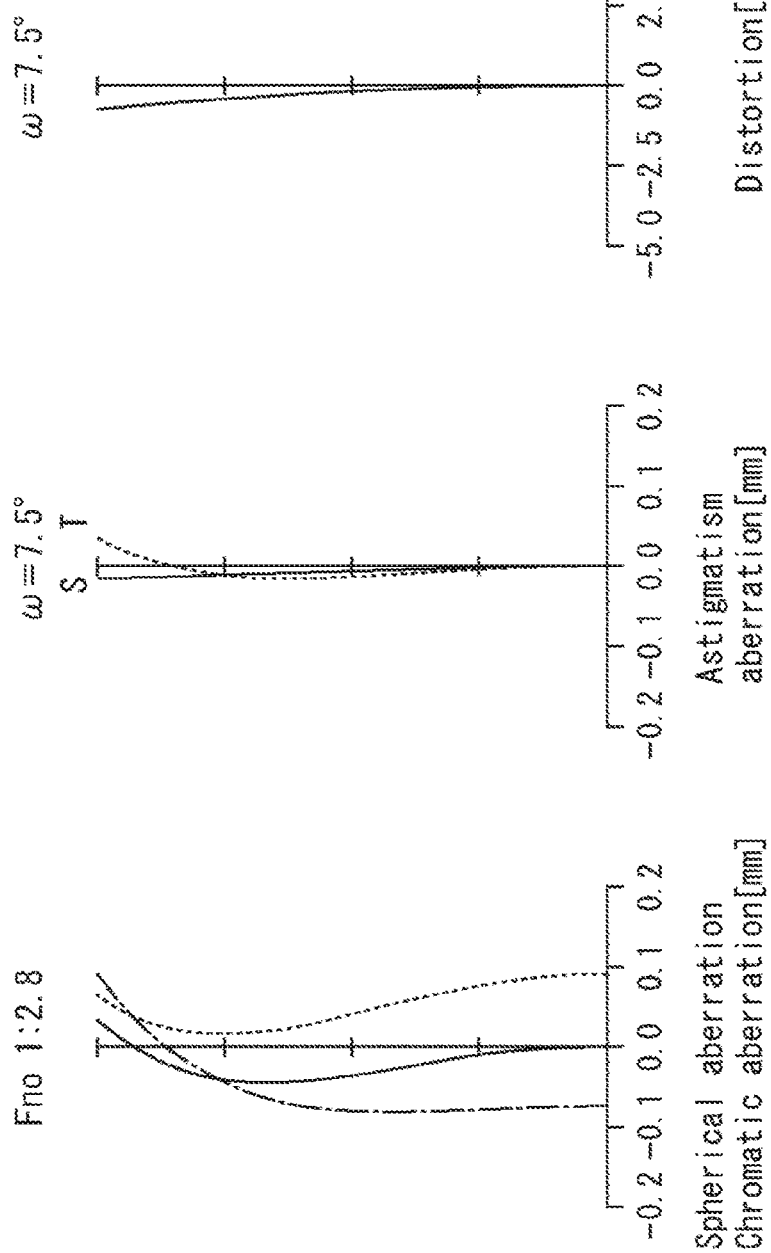
FIGS. 8A, 8B, and 8C are views illustrating various aberrations corresponding to a unifocal lens 31.
Figure 9:
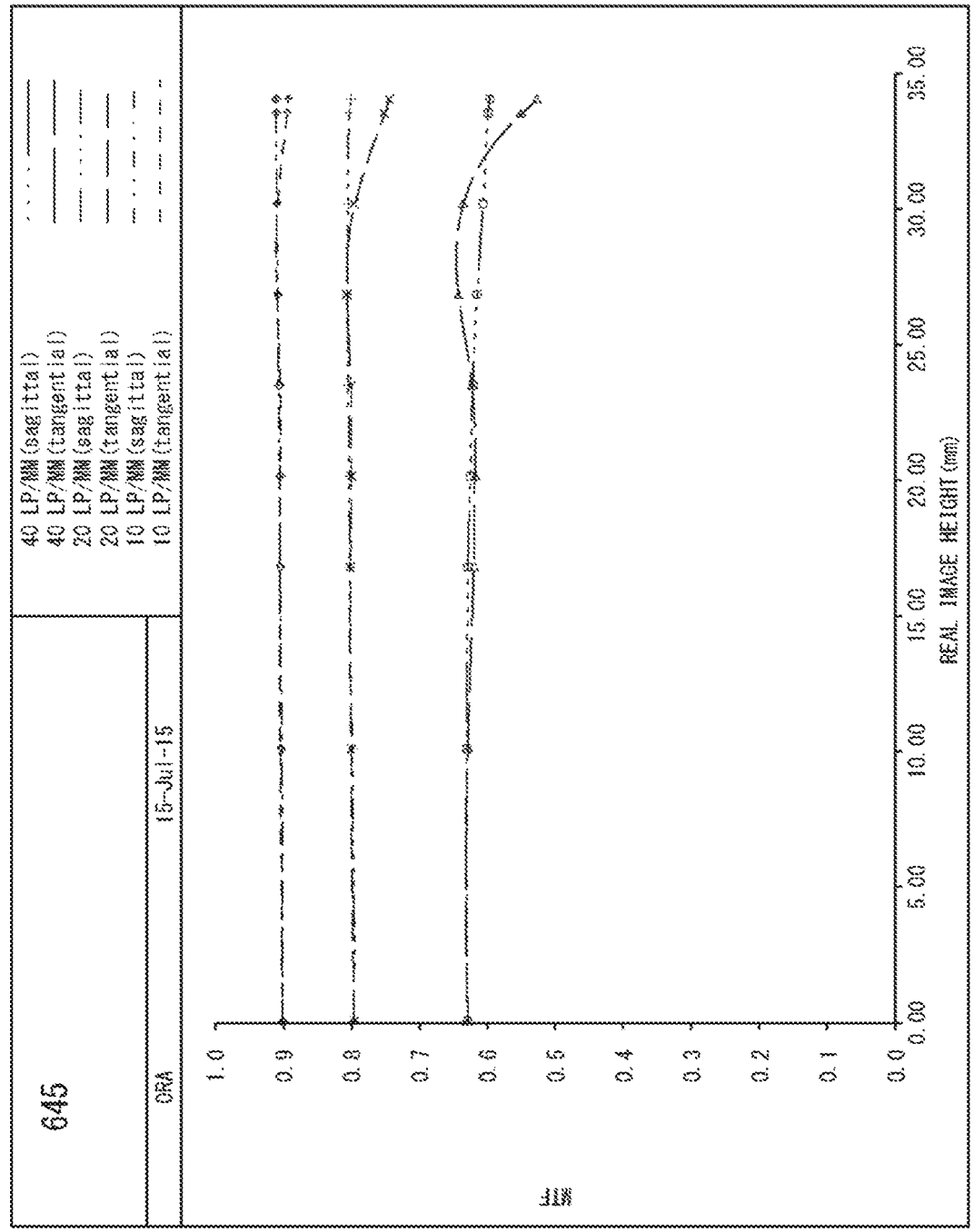
FIG. 9 is a view illustrating a relationship between an image height and an MTF of visual sensitivity corresponding to the unifocal lens 31.

FIGS. 8A, 8B, and 8C illustrate various aberrations corresponding to the unifocal lens 31 of the imaging device 30. FIG. 9 illustrates a relationship between an image height and an MTF of visual sensitivity corresponding to the unifocal lens 31 of the imaging device 30.

The unifocal lens 31 includes a first lens group 32 having positive power, an aperture stop 33, and a second lens group 34 having positive power in this order from an object side.

The first lens group 32 has a triplet configuration obtained by adhering a negative meniscus first lens 32-1 having a convex shape on the object side, a positive meniscus second lens 32-2 having a convex shape on the objection side, and a positive meniscus third lens 32-3 having a convex shape on the object side to one another in this order from the object side. The first lens group 32 as a whole is brought close to a retrofocus type which is advantageous for a wide angle.

Meanwhile, a focal length fg1 of the first lens group 32 is also designed to satisfy expression (1) described above.

The second lens group 34 is made pseudo-symmetrical with the first lens group 32 across the aperture stop 33. A focal length fg2 of the second lens group 34 is also designed to satisfy expression (2) described above.

As a result, the unifocal lens 31 has a wider field angle as compared to that of the unifocal lens 11 of the imaging 10 and the unifocal lens 21 of the imaging device 20 described above and has a medium telephoto focal length. In addition, due to an effect of pseudo-symmetrical arrangement of the first lens group 32 and the second lens group 34 each of which is brought close to the retrofocus type, this serves to correct asymmetric aberrations such as off-axis coma and astigmatism.

The imaging element 15 serves to correct image surface curvature of the unifocal lens 31 arranged on a preceding stage. That is, the curved imaging element 15 has a different Petzval sum optimum value as compared with a planar imaging element which is not curved of the same size, and has an optical system different from that in a case where a planar imaging element is applied as the best system. Specifically, the second lens group 34 having the focal length substantially close to the entire focal length corrects the various aberrations on the axis, and the curved imaging element 15 corrects image surface curvature aberration, so that off-axis various aberrations are also substantially inhibited. Then, the remaining various aberrations that cannot be eliminated are corrected by the first lens group 32.

However, it is also possible to perform distortion correction on an output from the imaging element 15.

Specific numerical values in a case where it is designed such that fg1/f=1.84 so as to satisfy expression (1) and fg2/f=1.09 so as to satisfy expression (2) are hereinafter described.

Lens configuration data of the unifocal lens 31 is as follows.

| Surface number | R | d | nd | vd |
|---|---|---|---|---|
| 1: | 172.656 | 3.000 | 2.00 | 29.1 |
| 2: | 117.797 | 20.000 | 1.59 | 67.0 |
| 3: | 314.842 | 6.514 | 1.95 | 32.3 |
| 4: | 664.860 | 60.400 | | |
| 5(STO): | INFINITY | 149.516 | | |
| 6: | 167.543 | 20.000 | 1.50 | 81.6 |
| 7: | -153.833 | 4.000 | 1.65 | 33.8 |
| 8: | -406.379 | 111.870 | | |

-continued

| Surface number | R | d | nd | vd |
|---|---|---|---|---|
| 9: | INFINITY | 0.700 | 1.52 | 64.1 |
| 10: | INFINITY | 4.000 | | |
| 11(IMG): | -250.000 | 0.000 | | |

Configuration data of the unifocal lens 31 is as follows.
f (focal length)=258 mm
F (numerical aperture)=2.8
ω (half field angle)=7.5 deg
H (total lens length)=380 mm The unifocal lens 31 manufactured in accordance with the above-described numerical values may realize a brighter Fno 2.8 with a simpler lens configuration of five lens elements in two groups while ensuring a field angle of 15 deg. Furthermore, a high MTF may be obtained.

In addition, since the unifocal lens 31 is such that a curved shape of the imaging element 15 has a radius of a spherical surface of 250 mm while satisfying an effective image circle of 645 size, this may be used as an interchangeable lens.

4. Fourth Embodiment

Figure 10:
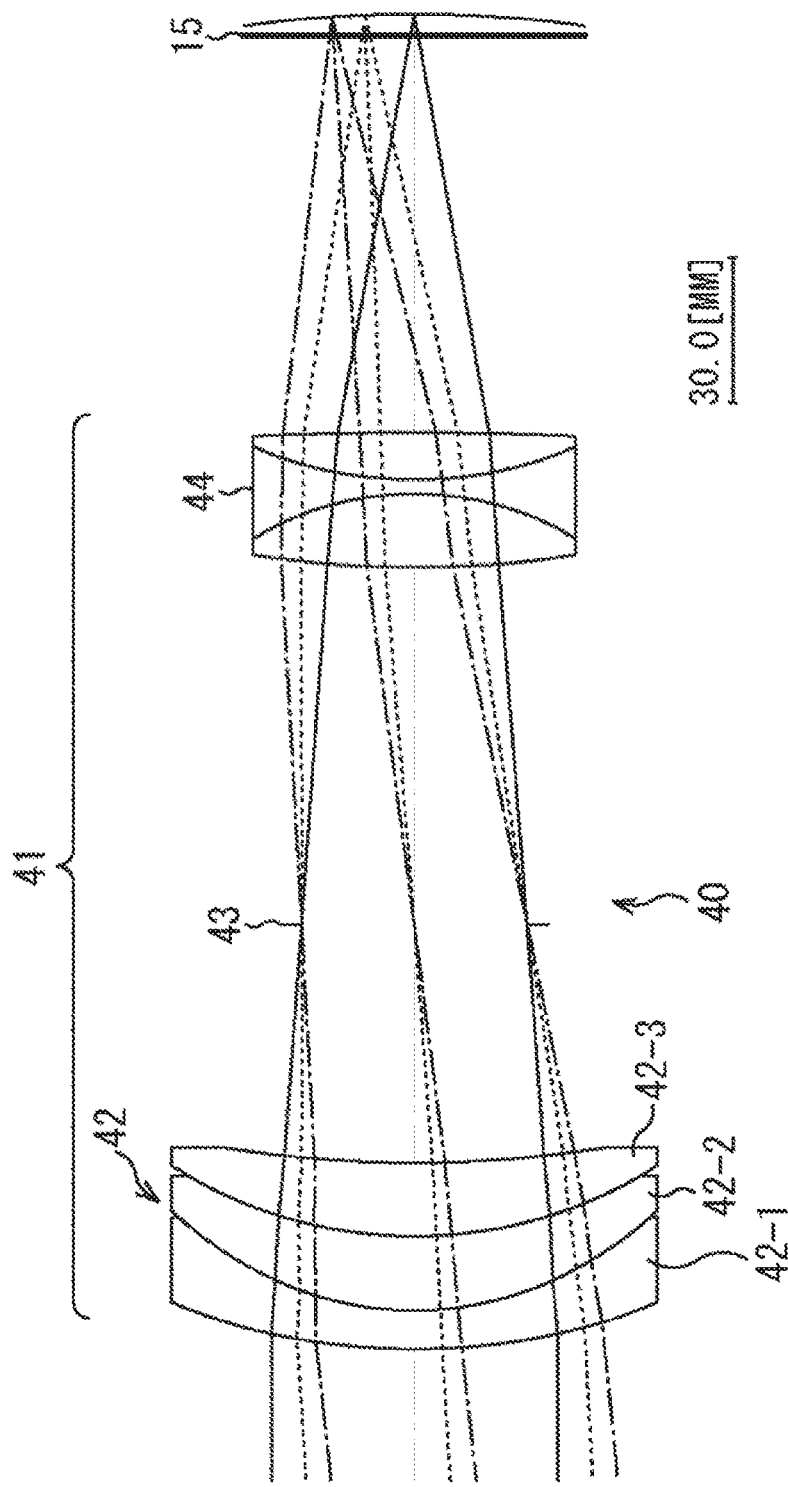
FIG. 10 is a view illustrating a configuration example of an imaging device 40 being a fourth embodiment.

Next, FIG. 10 illustrates a configuration example of an imaging device 40 being a fourth embodiment of the present disclosure.

The imaging device 40 applied to a telescope, a digital camera and the like includes a unifocal lens 41 having a lens configuration of six lens elements in two groups and an imaging element 15 the same as that of the above-described imaging device 10.

Figure 11:
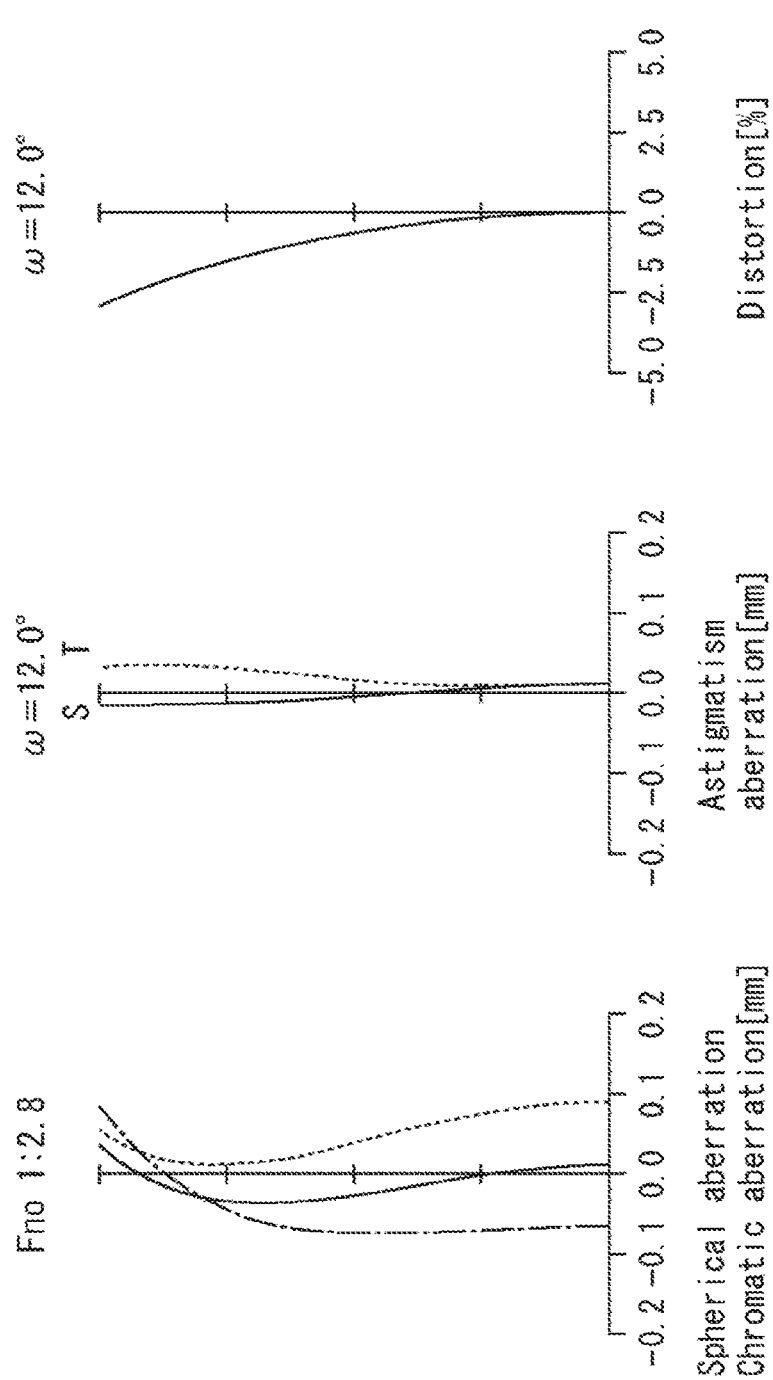
FIGS. 11A, 11B, and 11C are views illustrating various aberrations corresponding to a unifocal lens 41.
Figure 12:
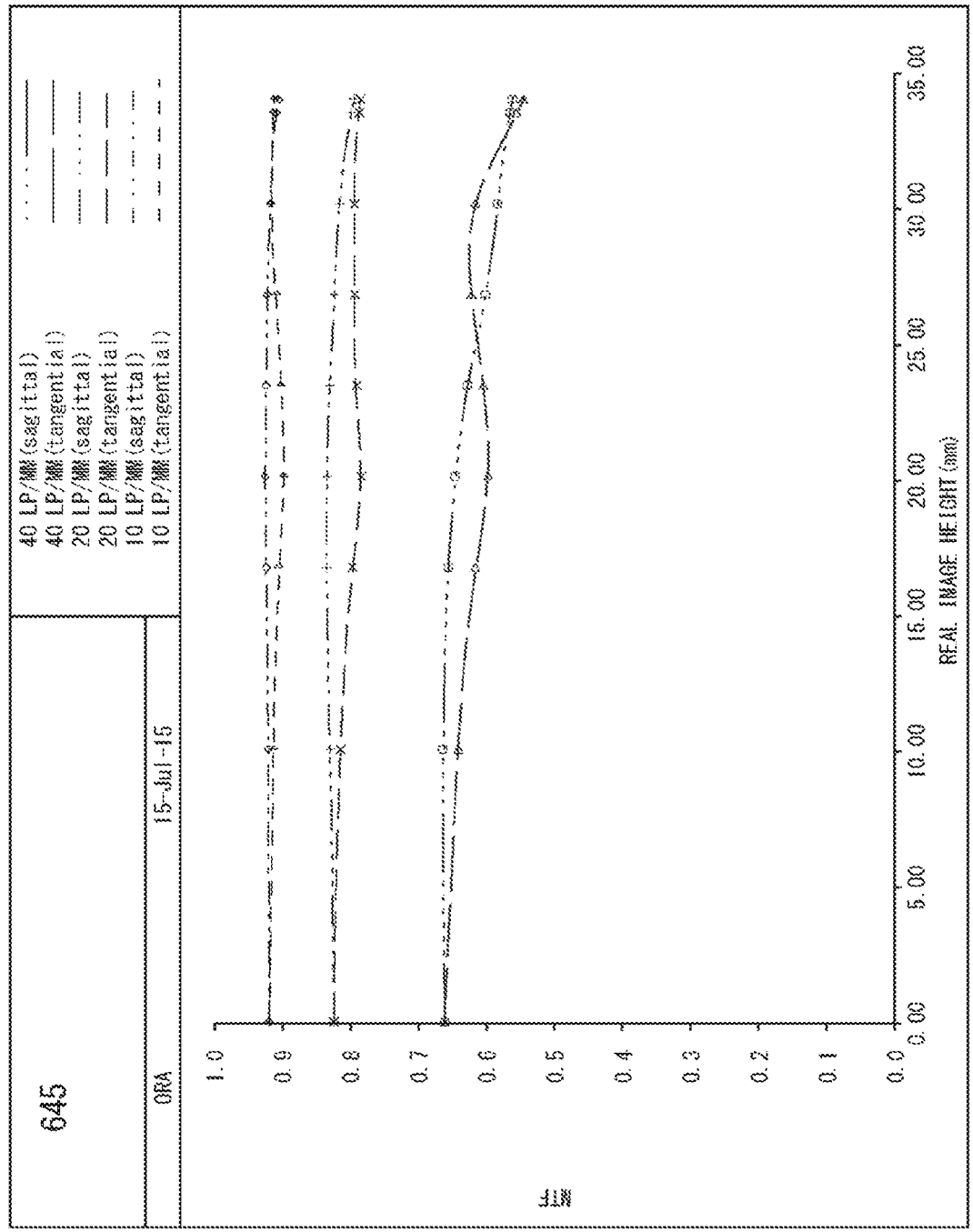
FIG. 12 is a view illustrating a relationship between an image height and an MTF of visual sensitivity corresponding to the unifocal lens 41.

FIGS. 11A, 11B, and 11C illustrate various aberrations corresponding to the unifocal lens 41 of the imaging device 40. FIG. 12 illustrates a relationship between an image height and an MTF of visual sensitivity corresponding to the unifocal lens 41 of the imaging device 40.

The unifocal lens 41 includes a first lens group 42 having positive power, an aperture stop 43, and a second lens group 44 having positive power in this order from an object side.

The first lens group 42 obtained by adhering first to third lenses 42-1 to 42-3 to one another in this order from the object side has a positive meniscus triplet configuration having a convex shape on the object side as a whole and is made close to a retrofocus type which is advantageous for a wide angle. Meanwhile, a focal length fg1 of the first lens group 32 is also designed to satisfy expression (1) described above.

The second lens group 44 has a triplet configuration having a biconvex shape as a whole and is made pseudo-symmetrical with the first lens group 42 across the aperture stop 43. A focal length fg2 of the second lens group 44 is also designed to satisfy expression (2) described above.

As a result, the unifocal lens 41 has a wider field angle as compared to that of the unifocal lens 11 of the imaging device 10 and the unifocal lens 21 of the imaging device 20 described above and has a medium telephoto focal length. In addition, due to an effect of pseudo-symmetrical arrangement of the first lens group 42 and the second lens group 44 each of which is brought close to a retrofocus type, this serves to correct asymmetric aberrations such as off-axis coma and astigmatism.

The imaging element 15 serves to correct image surface curvature of the unifocal lens 41 arranged on a preceding stage. That is, the curved imaging element 15 has a different Petzval sum optimum value as compared with a planar imaging element which is not curved of the same size, and has an optical system different from that in a case where a planar imaging element is applied as the best system. Specifically, the second lens group 44 having a focal length substantially close to an entire focal length corrects the various aberrations on the axis, and the curved imaging element 15 corrects image surface curvature aberration, so that off-axis various aberrations are also substantially inhibited. Then, the remaining various aberrations that cannot be eliminated are corrected by the first lens group 42.

However, it is also possible to perform distortion correction on an output from the imaging element 15.

Specific numerical values in a case where it is designed such that fg1/f=2.35 so as to satisfy expression (1) and fg2/f=0.99 so as to satisfy expression (2) are hereinafter described.

Lens configuration data of the unifocal lens 41 is as follows.

| Surface number | R | d | nd | vd |
|---|---|---|---|---|
| 1: | 135.830 | 8.064 | 1.69 | 31.2 |
| 2: | 70.831 | 15.000 | 1.50 | 81.6 |
| 3: | 91.492 | 15.000 | 1.81 | 39.6 |
| 4: | 238.714 | 49.331 | | |
| 5(STO): | INFINITY | 73.510 | | |
| 6: | 225.401 | 15.000 | 1.62 | 63.4 |
| 7: | −63.899 | 3.000 | 1.70 | 30.1 |
| 8: | 85.774 | 9.590 | 2.00 | 29.1 |
| 9: | −799.416 | 81.434 | | |
| 10: | INFINITY | 0.700 | 1.52 | 64.1 |
| 11: | INFINITY | 4.000 | | |
| 12(IMG): | −250.000 | 0.000 | | |

Configuration data of the unifocal lens 41 is as follows.
f (focal length)=258 mm
F (numerical aperture)=2.8
ω (half field angle)=12 deg
H (total lens length)=165 mm The unifocal lens 41 manufactured in accordance with the above-described numerical values may realize a brighter Fno 2.8 with a simpler lens configuration of six lens elements in two groups while ensuring a field angle of 24 deg. Furthermore, a high MTF may be obtained.

In addition, since the unifocal lens 41 is such that a curved shape of the imaging element 1 has a radius of a spherical surface of 250 mm while satisfying an effective image circle of 645 size, this may be used as an interchangeable lens.

5. Configuration Example Similar to Embodiments of Present Disclosure

Figure 13:
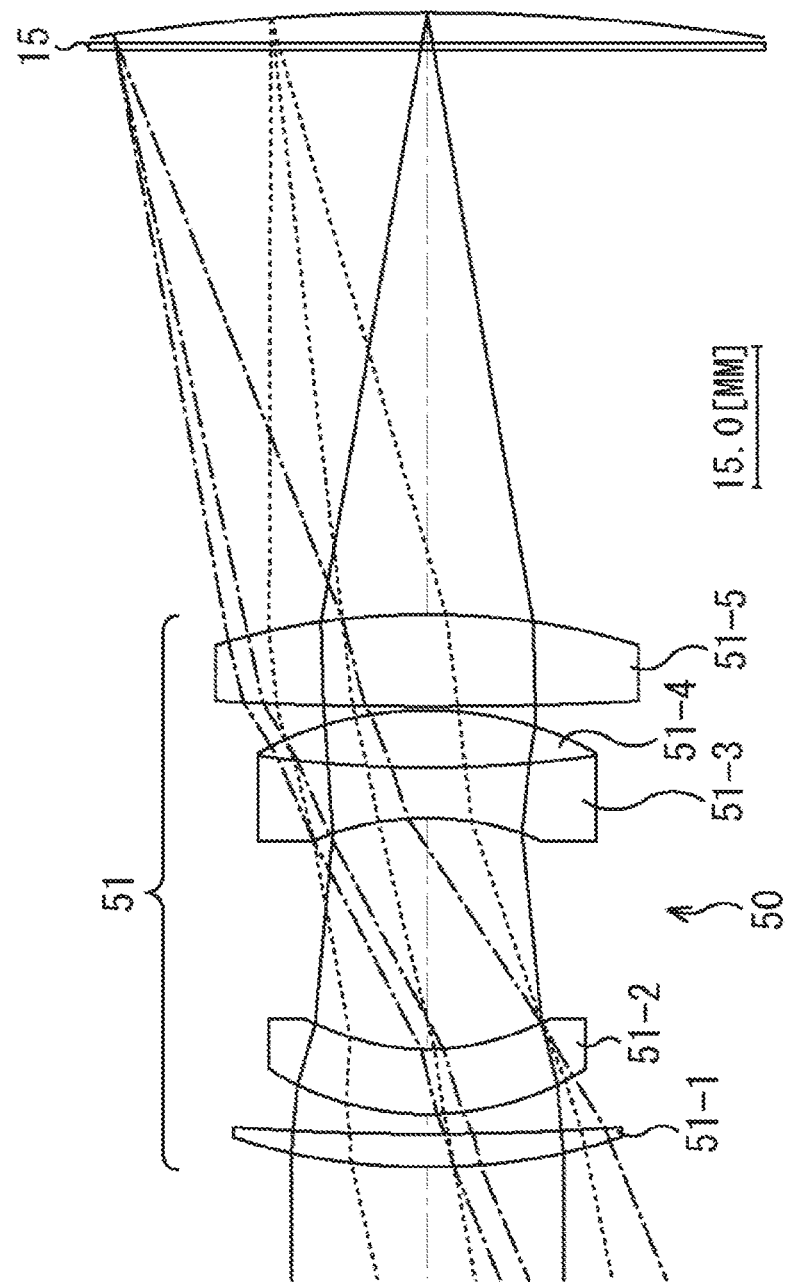
FIG. 13 is a view illustrating a configuration example of an imaging device 50.

Next, FIG. 13 illustrates a configuration example of an imaging device 50 similar to embodiments of the present disclosure.

The imaging device 50 includes a so-called double Gaussian unifocal lens 51 often referred to as a standard lens and an imaging element 15 arranged on an image forming surface.

Figure 14:
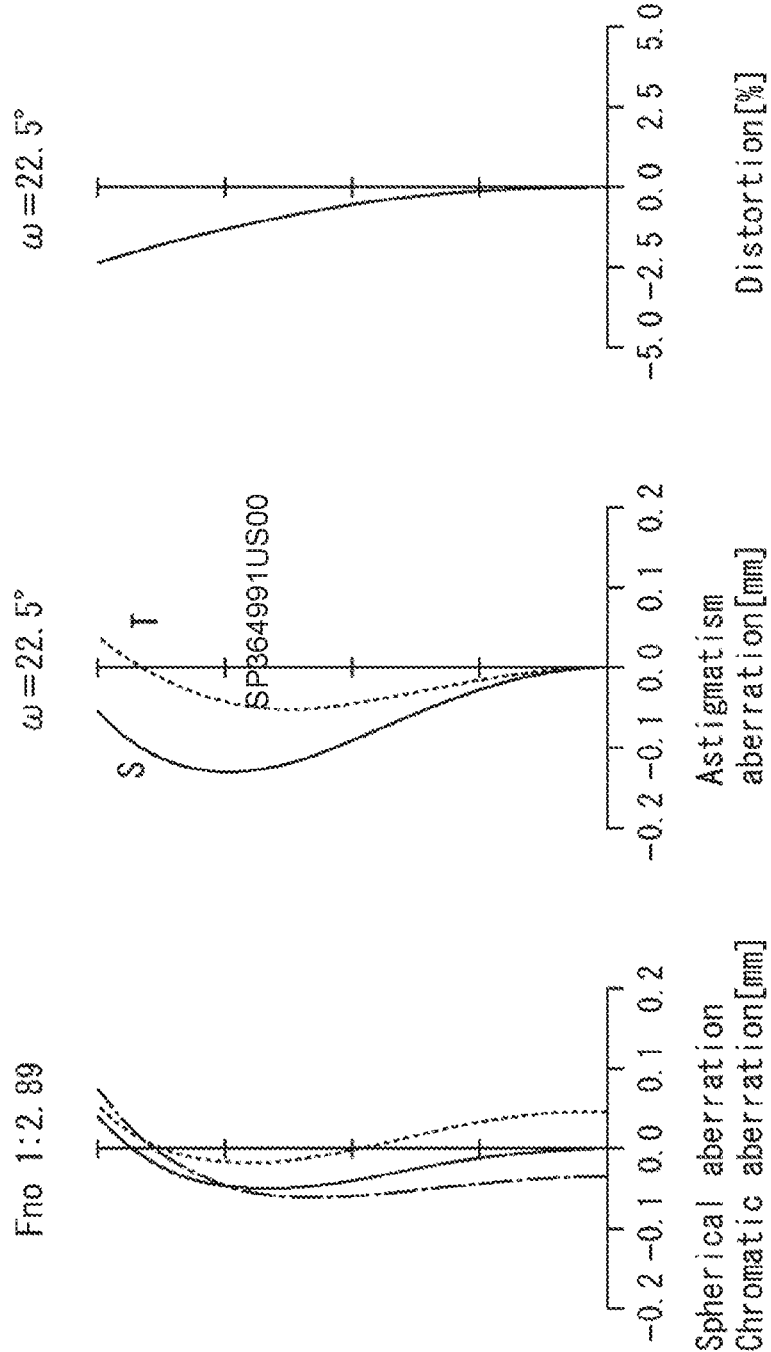
FIGS. 14A, 14B, and 14C are views illustrating various aberrations corresponding to a unifocal lens 51.
Figure 15:
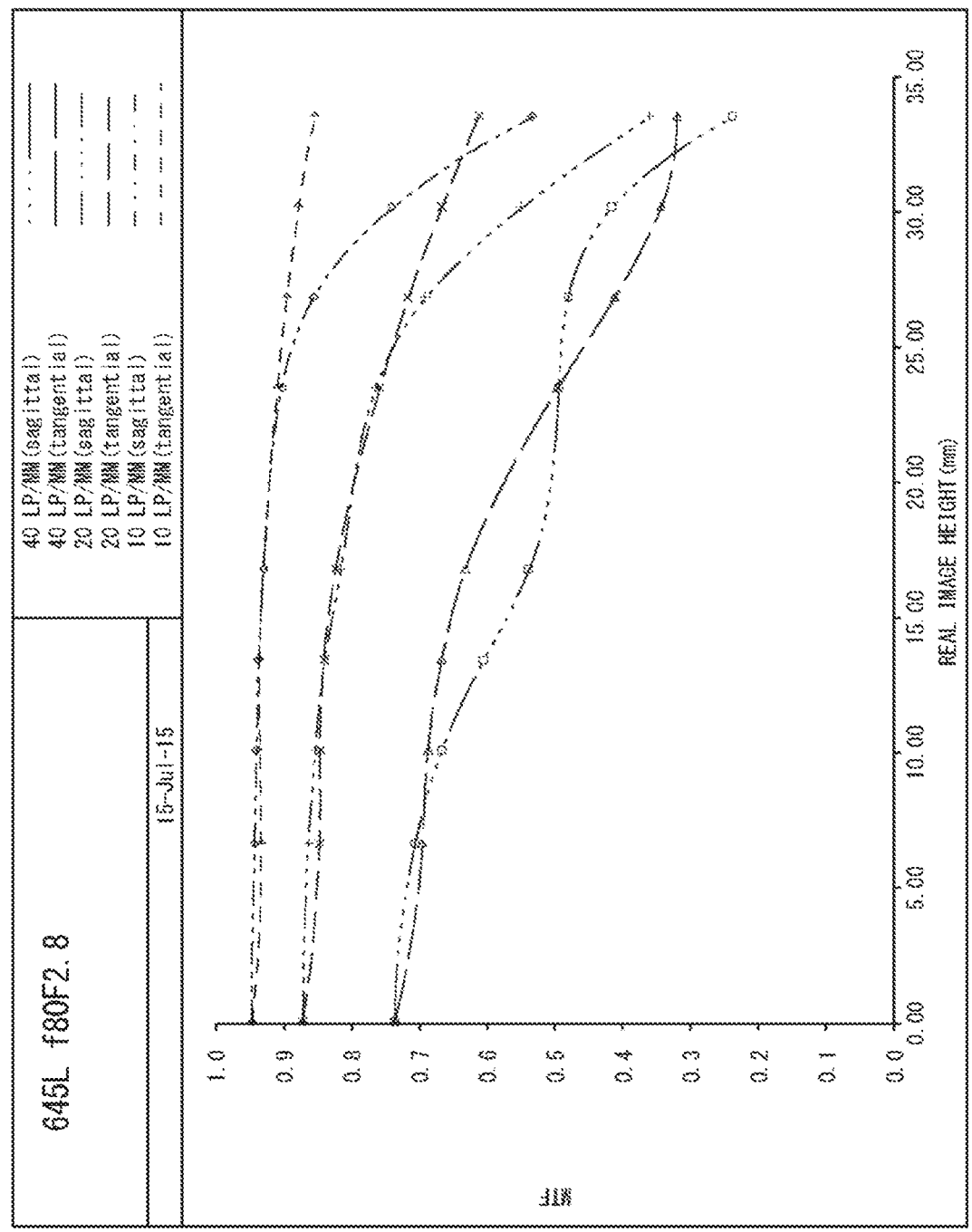
FIG. 15 is a view illustrating a relationship between an image height and an MTF of visual sensitivity corresponding to the unifocal lens 51.

FIGS. 14A, 14B, and 14C illustrate various aberrations corresponding to the unifocal lens 51 of the imaging device 50. FIG. 15 illustrates a relationship between an image height and an MTF of visual sensitivity corresponding to the unifocal lens 51 of the imaging device 50.

The unifocal lens 51 includes five lenses 51-1 to 51-5.

The imaging element 15 including a CMOS and the like has the largest class size for consumer use (for example, 645 size), and is curved with its concave surface facing the object side so as to alleviate a principal ray incident angle. As a result, this serves to correct image surface curvature of the unifocal lens 51 arranged on a preceding stage.

That is, the curved imaging element 15 has a different Petzval sum optimum value as compared with a planar imaging element which is not curved of the same size, and has an optical system different from that in a case where a planar imaging element is applied as the best system.

Meanwhile, unlike the unifocal lenses 11 to 41 described above, the unifocal lens 51 does not include two lens groups, so that detailed description of lens configuration data is omitted.

Configuration data of the unifocal lens 51 is as follows.
f (focal length)=84 mm
F (numerical aperture)=2.89
ω (half field angle)=22.5 deg
H (total lens length)=123 mm The unifocal lens 51 may realize a brighter Fno 2.89 with a simple five-lens configuration while ensuring a standard field angle of 45 deg. In addition, since the unifocal lens 51 also is such that a curved shape of the imaging element 15 has a radius of a spherical surface of 250 mm while satisfying an effective image circle of 645 size, this may be used as an interchangeable lens.

<Summary>

According to the first to fourth embodiments described above, it is possible to realize the imaging devices 10 to 40 which are brighter and having high resolution by adopting an imaging element of 645 size having the largest class size as a digital imaging element for consumer use.

Therefore, the imaging devices 10 to 40 are advantageous for applications such as astronomical observation in which exposure time is long and ghost affects an image.

In addition, each of the unifocal lenses 11 to 41 forming the imaging devices 10 to 40 includes two lens groups, so that a lens configuration is simple and it is sufficient that the lens has only four surfaces which are in contact with air, so that occurrence of ghost may be suppressed.

Also, in a case where attention is focused on the unifocal lenses 11 to 41, it is possible to realize a plurality of telephoto and middle telephoto interchangeable lenses having different field angles capable of being compatible with the curved imaging element 15. Furthermore, an imaging lens with a standard field angle may also be realized.

Meanwhile, the embodiments of the present disclosure are not limited to the above-described embodiments, and various modifications may be made without departing from the gist of the present disclosure.

The present disclosure may also have the following configurations.

(1)
  An imaging device provided with:
  a unifocal lens including a first lens group having positive power, an aperture stop, and a second lens group having positive power in this order from an object side; and
  an imaging element curved with a concave surface facing the object side, the imaging element generating an image signal in accordance with incident light collected by the unifocal lens.

(2)
  The imaging device according to (1) described above,
  in which each of the first and second lens groups is formed by adhering a plurality of lenses.

(3)
  The imaging device according to any one of (1) and (2) described above, in which a lens the closest to the object out of a plurality of lenses forming the first lens group is a negative meniscus lens having a convex shape on the object side.

(4)

The imaging device according to any one of (1) to (3) described above, in which a lens the closest to the object out of a plurality of lenses forming the second lens group has a biconvex shape.

(5)

The imaging device according to any one of (1) to (4) described above, in which a focal length fg1 of the first lens group satisfies following expression $1 \le fg1/f \le 5$, and a focal length fg2 of the second lens group satisfies following expression $0.5 \le fg2/f \le 1.1$, in which f represents a focal length of an entire unifocal lens.

(6)

The imaging device according to any one of (1) to (5) described above, further provided with:

a correcting unit which performs distortion correction processing on the image signal generated by the imaging element.

(7)

An electronic device provided with an imaging unit, in which the imaging unit is provided with:

a unifocal lens including a first lens group having positive power, an aperture stop, and a second lens group having positive power in this order from an object side; and an imaging element curved with a concave surface facing the object side, the imaging element generating an image signal in accordance with incident light collected by the unifocal lens.

REFERENCE SIGNS LIST

10 Imaging device
11 Unifocal lens
12 First lens group
13 Aperture stop
14 Second lens group
15 Imaging element
20 Imaging device
21 Unifocal lens
22 First lens group
23 Aperture stop
24 Second lens group
30 Imaging device
31 Unifocal lens
32 First lens group
33 Aperture stop
34 Second lens group
40 Imaging device
41 Unifocal lens
42 First lens group
43 Aperture stop
44 Second lens group
50 Imaging device
51 Unifocal lens

The invention claimed is:

1. An imaging device, comprising:
a unifocal lens configured to collect incident light, wherein
the unifocal lens includes:
a first lens group having positive power,
an aperture stop, and
a second lens group having positive power, wherein
the second lens group includes three lenses,
a first lens of the three lenses of the second lens group is biconvex in shape,
a second lens of the three lenses of the second lens group has a concave shape from an object side, and
the first lens group, the aperture stop, and the second lens group are in this order from the object side; and
an imaging element curved with a concave surface that faces the object side, wherein
the imaging element is configured to generate an image signal based on the collected incident light.

2. The imaging device according to claim 1, wherein the first lens group includes a plurality of lenses.

3. The imaging device according to claim 2, wherein a lens of the plurality of lenses of the first lens group that is closest to an object is a negative meniscus lens, and the lens has a convex shape on the object side.

4. The imaging device according to claim 1, wherein a first focal length (fg1) of the first lens group satisfies following expression:

$1 \le fg1/f \le 5$, a second focal length (fg2) of the second lens group satisfies following expression:

$0.5 \le fg2/f \le 1.1$, and f represents a focal length of the unifocal lens.

5. The imaging device according to claim 1, further comprising:
a correcting unit configured to perform distortion correction process on the generated image signal.

6. An electronic device, comprising:
an imaging unit that includes:
a unifocal lens configured to collect incident light, wherein
the unifocal lens includes:
a first lens group having positive power,
an aperture stop, and
a second lens group having positive power, wherein
the second lens group includes three lenses,
a first lens of the three lenses of the second lens group is biconvex in shape,
a second lens of the three lenses of the second lens group has a concave shape from an object side, and
the first lens group, the aperture stop, and the second lens group are in this order from the object side; and
an imaging element curved with a concave surface that faces the object side, wherein
the imaging element is configured to generate an image signal based on the collected incident light.

* * * * *